Feb. 23, 1937.  B. W. KEESE  2,071,537
AUTOMOTIVE VEHICLE
Filed March 21, 1935  2 Sheets-Sheet 1
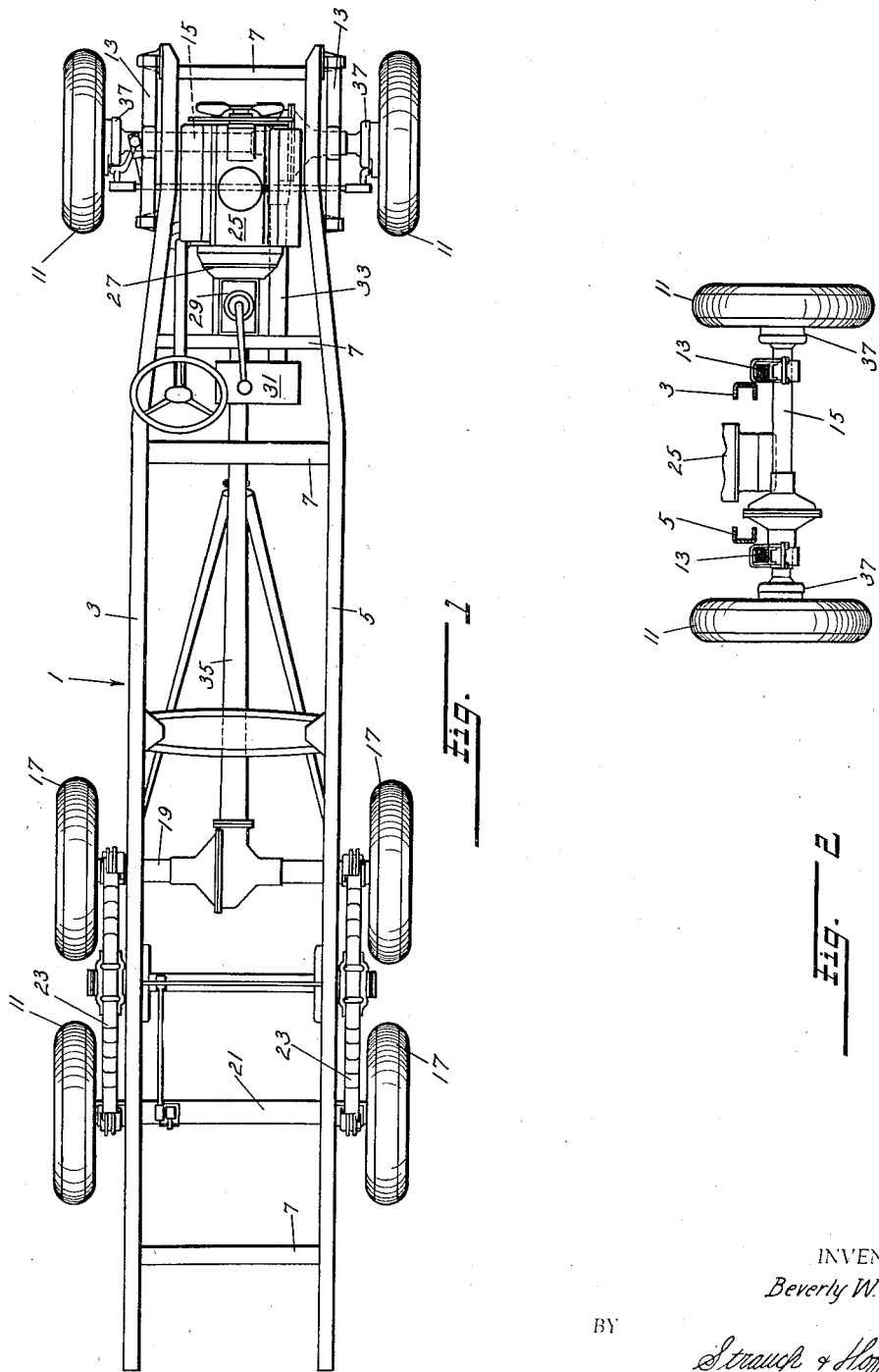
INVENTOR.
Beverly W. Keese
BY
Strauch & Hoffman
ATTORNEYS

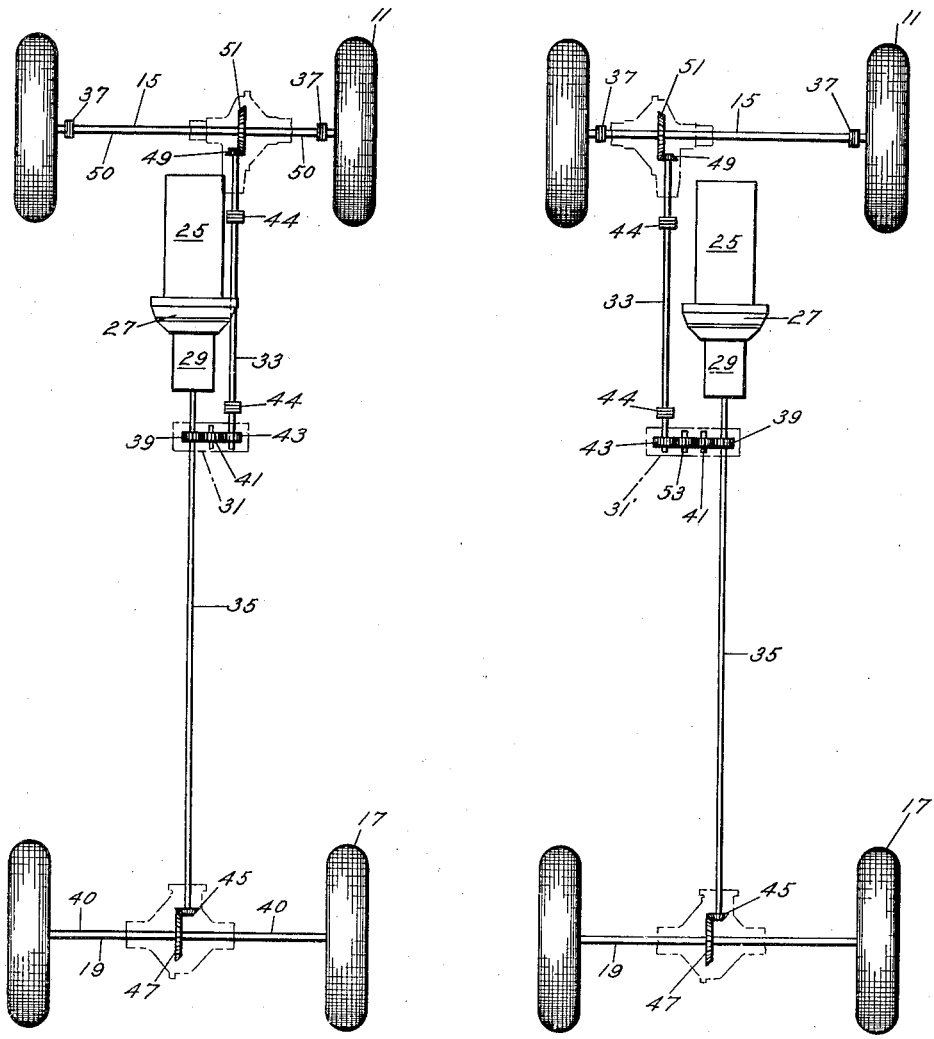

Patented Feb. 23, 1937

2,071,537

UNITED STATES PATENT OFFICE 2,071,537

AUTOMOTIVE VEHICLE

Beverly W. Keese, Oshkosh, Wis., assignor to The Timken-Detroit Axle Company, Detroit, Mich., a corporation of Ohio Application March 21, 1935, Serial No. 12,276

4 Claims. (Cl. 180—44)

This invention relates in general to vehicle running gear and in particular to vehicles wherein all, or at least the forward wheels thereof are driving wheels.

Great difficulty has been experienced in the past in installing a steering drive axle at the forward end of a vehicle because of space limitations. As is generally known, conventional vehicles, especially commercial vehicles such as busses and trucks, have their driving motors located at their forward ends directly over the forward axle. Also, the steering gear and apparatus is located at the forward portion of the vehicle chassis. A steering drive axle necessarily incorporates gearing, including driving and differential gears which must be housed within the axle, and also flexible driving means which usually take the form of universal joints, also housed within the axle, and the latter located near the wheel ends. These mechanisms naturally occupy considerable space.

Prior efforts to provide a steering drive axle for a vehicle have resulted in a specially designed vehicle, for room had to be made to accommodate the axle driving gear housing and the axle parts. The main reason for this is that the axles of prior art devices have used what are known as banjo-type of housings; that is, the portion of the housing which includes the axle gearing is shaped substantially the same as the head of a banjo. A differential carrier is ordinarily bolted to one side of the banjo and a rear axle cover is bolted to the other side. When assembled, such axles require considerable space, as the banjo portion of the housing is placed in such a manner that the flat portions thereof are in vertical planes and the outside diameter of the banjo must necessarily be of considerable size in order to enable the housing to accommodate the large bevel drive gear of the axle.

The installation of a front-drive axle becomes more difficult when the transmission is located at the rear of the engine and power is taken from the latter for driving the front axle assembly.

It is therefore a primary object of my invention to provide a vehicle running gear that will overcome all of the above mentioned disadvantages.

It is another major object of my invention to provide in a steering drive axle for a front drive vehicle, an axle driving gear housing assembly of such design that standard front end vehicle springing construction and related parts may be used therewith.

A further object of my invention is to provide a front drive axle vehicle wherein the driving gearing of the front steering drive axle is located between the vehicle longitudinal frame members.

It is an advantage in a vehicle to have the load supporting springs attached to the wheeled axle as close to the wheels as possible. In prior art vehicles of the type where the motor could not be raised to permit the insertion of the axle gearing between the vehicle frame members, the gearing was placed outside of the frame members and this necessitated moving the load-supporting springs either under or inside of said frame members. This resulted in a vehicle having a high center of gravity and inadequate lateral stability. This also necessitated the drive shaft connecting the rear end of the transmission with the axle gearing to be at an angle with the longitudinal axis of the vehicle. Such drive shafts necessarily incorporate universal joints at each end thereof and this angular displacement necessitated the joints working constantly at an angle which, in most cases, was very near to their maximum angularity.

It is therefore a further important object of my invention to provide a front drive vehicle wherein the front axle propeller shaft is parallel to the longitudinal vehicle axis.

It is another object of my invention to provide a front drive vehicle wherein the body of the vehicle proper is mounted low on the chassis, to give the vehicle a low center of gravity, and wherein the supporting springs are located close to the wheels to impart lateral stability to the vehicle.

As above stated, prior attempts to design a front drive axle have made it necessary to provide special arrangements in the forward end of the vehicle. Consequently, there has heretofore been no possibility of providing a front drive axle which could be marketed as a conversion axle for converting a standard 4-wheel, 2-wheel drive vehicle into a 4-wheel drive vehicle.

Therefore, a further object of my invention is to provide a front drive axle construction which may be readily adapted for the conversion of a standard 4-wheel, 2-wheel drive vehicle into a 4-wheel, 4-wheel drive vehicle, with a minimum of parts.

The above and further objects will be apparent from the following description when considered with the accompanying drawings and from the appended claims.

In the drawings:

Figure 1 is a plan view of a vehicle chassis showing one form of my invention embodied therein.

Figure 2 is an elevational view of the device shown in Figure 1, looking toward the chassis from the forward end and shows the front springs thereof in section.

Figure 3 is a diagrammatic plan view of the drive transmitting elements of the vehicle chassis illustrated in Figure 1; and Figure 4 is a diagrammatic plan view which is similar to Figure 3, but illustrates modification of my invention.

Referring now to the drawings, wherein like reference numerals refer to like parts wherever they occur, and with particular reference to Figure 1, the reference numeral 1 indicates a vehicle frame comprising longitudinal side rails 3 and 5 which in turn are tied together by means of a series of cross members, such as 7. The frame is supported at its forward end on wheels 11 by means of two springs 13 and an axle 15. Frame 1 is supported at its rearward end by means of wheels 17 through the axles 19 and 21 and springs 23.

It is to be understood that the vehicle may be supported at its rearward end by a single axle, if desired, without departing from the spirit of my invention. If it is desirable that dual axles be used as is shown in the drawings, they may be associated in any suitable desired manner, as the means for connecting them together forms no part of, nor is it material to the present invention. For the purpose of illustrating my invention, I have illustrated a dual axle arrangement, which is fully described and explained in Patent No. 1,946,060 issued to Laurence R. Buckendale on February 6, 1934, and co-pending applications, Alden Serial No. 5,647 filed February 8, 1935, and Alden Serial No. 711,423, filed February 15, 1934. It is also evident that, although I have illustrated the forward of the dual axles as being a driving axle and the rear axle as being an idle or trailing axle, both of said axles may be driving, or both may be trailing axles.

At the forward portion of the frame 1 an engine 25 is secured thereto and attached to the rear of said engine is a clutch 27. Attached to the rear of said clutch and drivingly connected therewith is a transmission 29 in well known conventional manner. Immediately to the rear of the transmission is a transfer case 31 which is employed for the purpose of diverting one-half of the engine power and transmitting it to the front driving axle by means of propeller shaft 33, and permitting the other half of the power to be transmitted to the rear driving axle by means of propeller shaft 35.

It may be desirable to incorporate a clutching element into the transfer case so that if desired the drive to either the front or rear driving axle may be interrupted and the vehicle propelled solely by either axle. Moreover a differential may, if desired, be incorporated in transfer case 31 for more accurately dividing the power between the front and rear wheels, and it is to be understood that the appended claims are intended to embrace my device when it assumes this form.

Propeller shaft 35 is drivingly connected to the driving mechanism contained within rear axle 19 whereby the drive is transmitted by suitable and conventional means to wheels 17. Propeller shaft 33 transmits one-half of the driving power of engine 25 to the driving gears housed within front axle 15, whereby wheels 11 are driven. The front axle 15 and rear axle 19 which house the axle driving gears and also the gears and associated cooperating parts and the gears themselves are preferably of the type disclosed in Patent No. 1,946,051, issued to H. W. Alden February 6, 1934. In this connection it should be particularly observed that the portions of the axle housings that enclose the gears are of the "split" type as distinguished from the "banjo" type, and therefore provide an axle assembly whose upper and lower halves are substantially V shaped when viewed from the front of the vehicle. It is also to be observed that the front axle housing assembly comprises two tubular members which are telescoped into the central or gear portion of the housing which is seen to have oppositely extending tubular portions. Springs 13 are seen to be supported by a pair of spring seats, one of which is provided on one of the tubular members, and the other of which is provided on one of the tubular portions of the gear housing.

The outer or steering ends 37 of front axle 15 are preferably—but not necessarily—of either of the designs illustrated in my co-pending applications, Serial No. 543,429 filed June 10, 1931, and Serial No. 719,028 filed April 4, 1934, or they may be of the type disclosed in the Herbert W. Alden application Serial No. 745,482, filed September 25, 1934. If desired, however, the outer ends of front axle 15 may be constructed in any other suitable manner, as my invention is not limited in application to any particular construction.

It is to be noted in Figure 2 that the lower portion of the motor 25 is substantially in the same plane as the side rails 3 and 5 of the vehicle frame 1, and that springs 13 are located outwardly of the frame and lie only slightly below it. It is also to be noted that the space between the sides of the lower portion of the motor and the frame side rails 3 or 5 is very limited and would not accommodate a housing of the banjo-type. Hence, if the banjo-type housing were used, it would be necessary to raise the frame and motor with respect thereto. It is noted that the portion of the axle which houses the driving mechanism, by reason of its V shape, readily "nests" or fits very nicely into this restricted space and yet requires no change in the normal relation of the usual front (idle) axle to the frame and the motor. It is also noted that there is ample room inside of the steering portions 37 of the axle 15 and outside of frame side rails 3 and 5 for the springs 13.

Referring now to Figure 3, the operation of the vehicle, or the method by which the wheels are driven, takes place as follows:

Motor torque is selectively transmitted to transmission 29 by means of clutch 27 by the operator in well known manner. With clutch 27 engaged, and with transmission 29 in gear, torque is transmitted to transfer case 31, which has therein, preferably in constant mesh, gears 39, 41 and 43. Gear 39 is directly connected to the shaft connecting transmission 29 and transfer case 31, and is also connected with propeller shaft 35 leading to the rear axle gearing-bevel pinion 45 and bevel ring gear 47. Ring gear 47 is drivingly connected—through differential gearing (not shown)—with rear axle shafts 40, which in turn are drivingly connected with wheels 17. Gear 39 of transfer case 31 meshes with idler gear 41, which in turn meshes with gear 43. Gear 43 is attached to one end of forward propeller shaft 33. Propeller shaft 33 preferably consists of three sections joined by universal joints indicated diagrammatically as 44. These joints are provided so as to permit front axle 15 to reciprocate vertically in response to road conditions, but it is to be understood that if an independent front wheel suspension is used these joints may be omitted as the axle housing 15 would then be supported upon the frame. The forward portion of propeller shaft 33 is operatively connected with the gearing of forward axle 15—bevel pinion 49 and bevel ring gear 51. Bevel ring gear 51 is operatively connected—through differential gearing (not shown)—with front axle shafts 50, in turn which drive wheels 11 through universal joints in the outer steering ends of the axles.

It should be particularly observed that propeller shaft 33 is not only substantially horizontally disposed, but it is also substantially parallel to the longitudinal axis of the vehicle, with the result that under normal conditions universal joints 44 will operate at zero deflection or angularity, and when under severe road conditions will only operate through a small range of angularity. It is also to be observed that my novel driving mechanism makes it unnecessary to project the propeller shaft through any of the frame members, thereby making for a sturdy and compact structure.

It is to be noted that in the form of my invention just described the front axle gearing is located on the right-hand side of the vehicle. With the gearing arrangement shown, and with the conventional direction of rotation of automotive motors—counter-clockwise—(looking forwardly in the vehicle) the three gears of transfer case 31 transmit the torque of the forward axle in the correct rotational direction to provide proper directional driving of the wheels.

Referring now to Figure 4, wherein a modified form of driving mechanism is shown, it is evident that the only change in the arrangement diagrammatically shown in this figure over that of Figure 3 is that the forward axle gearing is located on the left-hand side of the vehicle, and that an extra gear 53 has been added to transfer case 31'. This is necessary due to the fact that in order to have the driving gearing between the lower portion of the motor and the frame side rails 3 or 5 it is necessary to turn the axle 15 end for end and hence the rotational direction of axle 15 itself is reversed. The additional idler gear 53 compensates for this reversal of rotation. If desired, however, gears 39 and 43 may be made of somewhat larger size and idle gears 41 and 53 omitted from the construction, as this arrangement will effect proper rotation. Moreover, if a special axle 15 is employed, with the pinion disposed on the opposite side of the ring gear, it is apparent that this would compensate the rotation and render an extra idle gear unnecessary.

From the above and foregoing description it is evident that my invention contemplates a vehicle having a very efficient and compact running gear and this is especially true of the running gear for driving the forward wheels. It is also evident that my forward driving axle is adapted for use in standard vehicles and this advantage will be more apparent in view of the present trend toward moving the motor forwardly of the front axle.

Although I have illustrated transfer case 31 as embodying a set of constantly meshed, constant ratio gears, it is to be understood that, if desired, it may be equipped with a selectively or automatically clutched two-speed gear arrangement of any suitable form for driving the front and rear propeller shafts without departing from the spirit of my invention. Moreover, if desired, the transfer case 31 may be omitted and the transfer gears directly incorporated in transmission 29, and the appended claims are intended to embrace my mechanism when it assumes this form.

It is also to be understood that although I have illustrated and prefer to employ a front axle 15 which is split in a plane disposed longitudinally of the vehicle chassis, as the "differential" portion of such axles generally present an upright oval formation when viewed from the front or rear of the vehicle, (Figure 2) and allow the frame, springs and motor to be compactly disposed, it is to be understood that an axle assembly which is split in any other plane or planes may be used without departing from the spirit of my invention, so long as it is constructed to have a substantially upright oval configuration, and the appended claims are intended to embrace my device when it assumes these forms.

Although I have illustrated a front axle assembly which is particularly advantageous for use in a vehicle where the engine is located at the front of the chassis, the axle construction shown in Figure 2 may be used in rear motored vehicles if desired without departing from the spirit of my invention. In such construction the engine may be mounted to have its major part either forwardly or rearwardly of the rear axle, but in any event the organization would assume the general appearance seen in Figure 2, when viewed from the front or rear of the vehicle.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In an automotive vehicle, a pair of longitudinal frame members, a transversely disposed axle housing, means for connecting said axle housing to said frame members, a prime mover mounted on said frame members and having at least a portion thereof projecting downwardly between said frame members and overlying said axle housing, said axle housing having an enlarged gearing portion disposed between the downwardly extending portion of said prime mover and one of said frame members, a pair of axles mounted in said axle housing and a drive shaft projecting from said enlarged gearing portion of said axle housing, a gear mechanism mounted in said enlarged gearing portion of said axle housing and providing a speed reducing drive between said drive shaft and said axles, the gearing portion of said axle housing being of substantially circular form in longitudinal section and of substantially vertical elliptical form in transverse section.

2. The vehicle construction described in claim 1, wherein the said means for connecting said axle housing to said frame members comprises a pair of leaf springs disposed outwardly of said frame members, said springs being substantially parallel to said frame members, the top leaves of said springs lying in substantially the same horizontal plane as the lower edges of said frame members.

3. The vehicle construction described in claim 1, wherein the radius of said gearing portion of said axle housing is greater than the distance of the axis of the latter from said frame members.

4. The automotive vehicle construction described in claim 1, wherein said axle housing is split in a vertical plane parallel to said frame members in the region of the enlarged gearing portion of said axle housing.

BEVERLY W. KEESE.